United States Patent [19]

Clegg

[11] Patent Number: 4,610,518
[45] Date of Patent: Sep. 9, 1986

[54] INVOLUTE BEAM CONCENTRATOR

[76] Inventor: John E. Clegg, 2320 Keystone Dr., Orlando, Fla. 32806

[21] Appl. No.: 681,972

[22] Filed: Dec. 14, 1984

[51] Int. Cl.$^4$ ............................ G02B 5/10; F24J 2/10; F24J 2/14
[52] U.S. Cl. .................................. 350/630; 126/438; 126/439; 350/613; 350/628; 350/629; 372/99; 372/107
[58] Field of Search ............... 350/608, 613, 614, 619, 350/628–630; 372/19, 94, 98, 99, 103, 104, 107; 126/417, 422, 424, 434, 438–442, 450, 451

[56] References Cited

U.S. PATENT DOCUMENTS

| | | | |
|---|---|---|---|
| 3,151,206 | 9/1964 | Daymon | 350/630 |
| 3,222,615 | 12/1965 | Holly | 372/94 X |
| 3,285,333 | 11/1966 | Johnson, Jr. | 126/439 X |
| 3,337,871 | 8/1967 | Greenberg et al. | 350/630 X |
| 3,768,035 | 10/1973 | Zar | 372/104 |
| 3,851,273 | 11/1974 | Hoag et al. | 372/104 |
| 3,958,553 | 5/1976 | Brantley, Jr. | 126/441 |
| 3,964,464 | 6/1976 | Hockman | 126/442 X |
| 4,006,971 | 2/1977 | Plummer | 350/629 |
| 4,106,485 | 8/1978 | Polley | 126/439 X |
| 4,120,587 | 10/1978 | Vali et al. | 372/94 X |
| 4,287,880 | 9/1981 | Geppert | 126/439 |
| 4,350,412 | 9/1982 | Steenblik et al. | 350/630 |
| 4,361,136 | 11/1982 | Huang | 126/438 |
| 4,402,574 | 9/1983 | McConnel | 350/418 |
| 4,440,153 | 4/1984 | Melchior | 126/438 |
| 4,567,879 | 2/1986 | Clegg | 126/440 |

Primary Examiner—John Petrakes

[57] ABSTRACT

A glass or metal wall forming an involute curve through three revolutions around a central axis parallel thereto, mounted between parallel front and rear walls perpendicular thereto and forming a chamber which is curved in cross section and rectangular in longitudinal section.

The chamber is reflective in the interior and communicates with the exterior through a rectangular port formed by the terminating involute wall and the section of involute wall adjacent thereto.

A concentrated rectangular beam of sunlight from a prismatic beam concentrator is projected into the chamber through the port. The beam undergoes further concentration as it curves in toward the center of the concentrator, where it is emitted through an aperture in the rear wall, forming a concentrated circular beam parallel to the axis of the concentrator.

1 Claim, 2 Drawing Figures

INVOLUTE BEAM CONCENTRATOR

BACKGROUND

The nearest prior art is the cylindrical chamber of lasers.

DRAWINGS

DESCRIPTION

Figure 1:
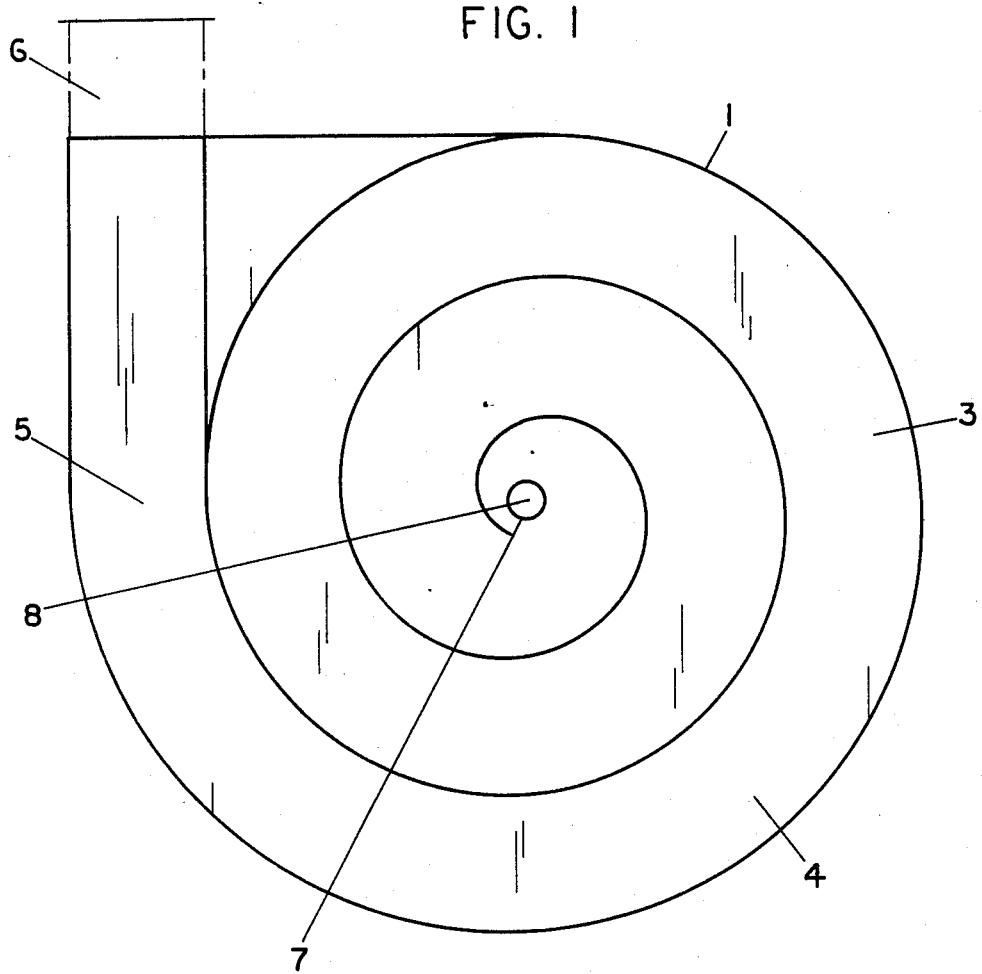
FIG. 1 is a cross section of the involute beam concentrator with the involute wall and rear wall exposed to view.
Figure 2:
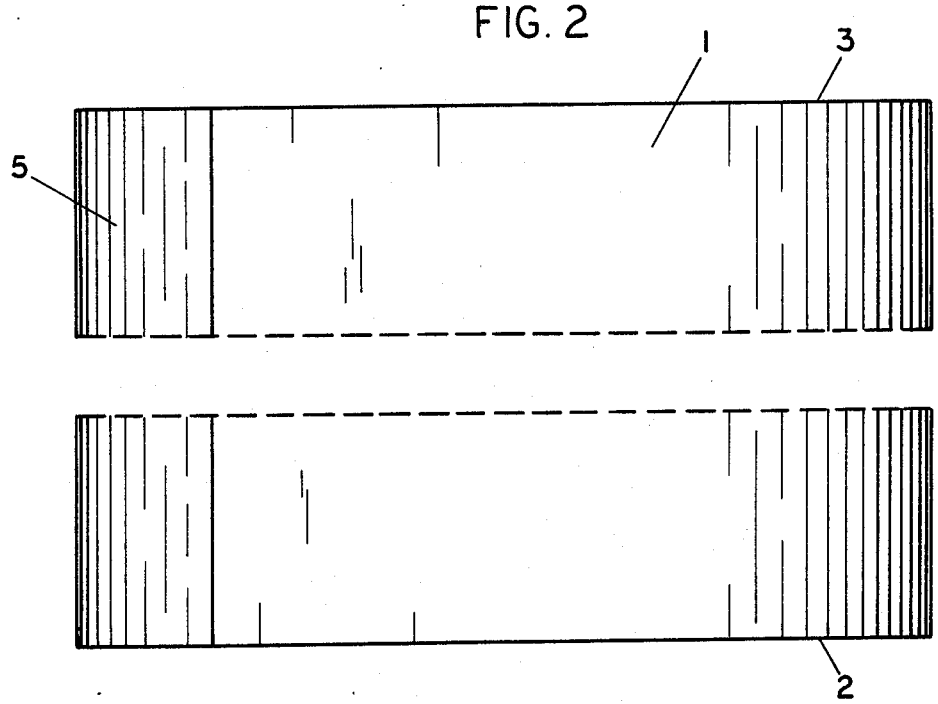
FIG. 2 is a top view of the involute beam concentrator.

FIG. 1 is a cross section of the involute beam concentrator showing involute glass wall 1 which forms an involute curve through three revolutions around a central axis parallel thereto. Involute wall 1 is mounted between parallel front wall 2 and rear wall 3 which are perpendicular thereto, forming a chamber 4 which is curved in cross section and rectangular in longitudinal section.

The interior surfaces of involute wall 1, front wall 2 and rear wall 3 are reflective.

Chamber 4 communicates with the exterior through rectangular port 5 formed between the terminating section of involute wall 1, the section of involute wall 1 adjacent thereto, front wall 2 and rear wall 3.

The involute beam concentrator receives a concentrated beam 6 of sunlight from a prismatic beam concentrator. Beam 6 is projected into the concentrator through port 5 and undergoes additional concentration as it curves through chamber 4 to the center of the concentrator. Beam 6 is emitted through aperture 7 in rear wall 3, forming a concentrated circular beam 8 which is parallel to the central axis of the concentrator.

The primary purpose of the involute beam concentrator is to convert a long rectangular beam, such as that emitted by the prismatic beam concentrator and received in the center of the involute beam concentrator, into a circular beam which can be projected laterally.

In practice the prismatic beam concentrator and the involute beam concentrator will be several meters in length.

I claim:

1. An involute beam concentrator comprising in general an involute glass wall forming a spiral reflective chamber for the reception and concentration of a beam of light from a prismatic beam concentrator, and comprising in particular;

an involute glass wall (1) forming an involute curve through three revolutions around a central axis parallel thereto, said involute wall having two parallel sides, a front wall (2) and a rear wall (3), said front wall and said rear wall mounted on opposite said sides of said involute wall to form a chamber (4), said chamber being spiral in cross section and rectangular in longitudinal section, said involute wall, said front wall and said rear wall having interior reflective surfaces, a rectangular port (5) formed by the terminating section of said involute wall and by the adjacent section of said involute wall, said port serving as an opening through which said beam (6) from a prismatic beam concentrator is received into the involute beam concentrator, and a circular aperture (7) located in the center of said rear wall, said aperture serving as an opening through which a concentrated circular beam (8) is emitted from the involute beam concentrator.

* * * * *